US005710633A

United States Patent [19]

Klappenbach et al.

[11] Patent Number: 5,710,633
[45] Date of Patent: Jan. 20, 1998

[54] FASTENING AND COUPLING OF AN OPTOELECTRONIC SENSOR TO A PANE AND STRUCTURE OF THE SENSOR

[75] Inventors: Christoph Klappenbach, Buehl; Guenther Riehl, Buehlertal; Manfred Burkart, Iffezheim, all of Germany

[73] Assignee: Robert Bosch GmbH, Stuttgart, Germany

[21] Appl. No.: 687,607

[22] PCT Filed: Mar. 23, 1995

[86] PCT No.: PCT/DE95/00401

§ 371 Date: Aug. 8, 1996

§ 102(e) Date: Aug. 8, 1996

[87] PCT Pub. No.: WO95/25651

PCT Pub. Date: Sep. 28, 1995

[30] Foreign Application Priority Data

Mar. 24, 1994 [DE] Germany ............................ 44 10 217.8

[51] Int. Cl.$^6$ .............................. G01N 21/88; B60S 1/02; G01W 1/00
[52] U.S. Cl. ...................... 356/445; 318/DIG. 2; 15/DIG. 15; 356/136
[58] Field of Search ............................ 356/136, 445; 318/480, 483, DIG. 2; 15/DIG. 15; 250/341.8

[56] References Cited

U.S. PATENT DOCUMENTS

| 4,701,613 | 10/1987 | Watanabe et al. ............... 250/227 |
|---|---|---|
| 4,871,917 | 10/1989 | O'Farrell et al. ............... 250/341 |
| 4,973,844 | 11/1990 | O'Farrell et al. ............... 250/341 |
| 5,414,257 | 5/1995 | Stanton ............... 250/341.8 |

FOREIGN PATENT DOCUMENTS

| 0412 653 | 2/1991 | European Pat. Off. . |
|---|---|---|
| 0416424 | 12/1991 | European Pat. Off. . |
| 4343474 | 7/1984 | Germany . |
| 4006420 | 9/1991 | Germany . |
| 4329608 | 1/1995 | Germany . |
| WO 92/18848 | 10/1992 | WIPO . |

Primary Examiner—Richard A. Rosenberger
Attorney, Agent, or Firm—Spencer & Frank

[57] ABSTRACT

An optoelectronic sensor 1 for detecting foreign bodies, especially raindrops on a windshield, includes an outer housing part 2 and an inner housing part as well as a fastening device 4, which is glued to a pane 5. A fastening means, for instance comprising two slides 6, is provided, guided in the outer housing part 2, and can be made to engage the fastening device 4 for securing the sensor 1 to the pane 5. In the interior of the sensor 1, the inner housing part, which carries the optoelectronic elements of the sensor 1, is pressed toward the pane 5 with a spring force braced against the outer housing part 2, in order to accomplish the optical coupling with the pane.

13 Claims, 2 Drawing Sheets

FASTENING AND COUPLING OF AN OPTOELECTRONIC SENSOR TO A PANE AND STRUCTURE OF THE SENSOR

BACKGROUND OF THE INVENTION

Prior Art

The invention is based on a sensor for optically detecting foreign bodies, especially raindrops, on a pane, particularly on the windshield of a motor vehicle, of the type including a transmitter and a receiver, which are coupled on the inside of the pane, for detecting foreign bodies on the outside of the pane in the region of the measurement path between the transmitter and the receiver.

In a known device of this type (German Patent Disclosure DE 40 06 420 A1), on the inside of an optically transparent pane, the sensor that contains a transmitter and receiver is glued directly to the inside of a pane with the aid of an intermediate layer. The intermediate layer comprises an optically nontransparent film, which has recesses in the region of the transmitter, the receiver, and the measurement path between them. Pieces of film comprising optically transparent material are inserted into the two recesses for the transmitter and the receiver. With the aid of this intermediate layer, comprising different materials, the sensor is adhesively secured directly to the inside of the pane, in particular the windshield of a motor vehicle.

The device described above requires an especially embodied film of the intermediate layer and must be glued on over the entire length of the transmitter injection, measurement path, and receiver decoupling. It proves to be especially difficult in practice to glue such a layer of relatively great size onto the surface of the pane without trapping air bubbles. The functioning and proper operation of the sensor, however, require that the optical coupling of the transmitter and receiver to the pane be done so directly that there is no change in the diffraction conditions of the beam path at the transition into the pane. In the gluing operation, however, such a change is disadvantageously brought about from air inclusions between the pane and the transmitter/receiver.

SUMMARY AND ADVANTAGES OF THE INVENTION

A sensor according to the invention for optically detecting foreign bodies, especially raindrops, on a pane, particularly on the windshield of a motor vehicle, includes a transmitter and a receiver which are coupled on the inside of the pane to detect foreign bodies on the outside of the pane in the region of the measurement path between the transmitter and the receiver: and wherein the sensor includes an outer housing part and an inner housing part as well as a fastening device that is glued to the pane; the essential or functional elements of the sensor are held by the inner housing part; the inner housing part is pressed against the pane by at least one spring which engages the outer housing part; and, a fastening means is mounted on the outer housing part and engages the fastening device in order to releasably secure the sensor to the pane.

The sensor of the invention as defined by the characteristics of the body of claim 1 has the advantage over the prior art that it reliably precludes air inclusions between the pane and the transmitter/receiver. In this highly critical region, as well as in the region of the measurement path between the transmitter and the receiver, adhesive technology is used neither for securing the sensor to the pane nor for the optical coupling. Advantageously, the transmitter and receiver are pressed against the surface of the pane and thus coupled to it by means of silicone pads pressed by spring force. The sensor advantageously has both an outer and an inner housing part and a fastening device that is glued to the pane. The inner housing part carries the essential optoelectronic elements and is pressed against the pane by spring force that engages between the outer and the inner housing part. The outer housing part has a fastening means that can be made to releasably engage the fastening device glued to the pane, in order to secure the sensor to the pane.

Because according to the invention only the fastening device itself is glued to the pane, this operation can be separated entirely from the mounting of the sensor itself. For instance, the windshield manufacturer can already glue the fastening device in the precise position. The sensor is then not mounted until the motor vehicle is built, for instance.

By means of further described and disclosed provisions advantageous further features of and improvements to the basic sensor according the invention are possible.

In the sensor of the invention, the fastening device advantageously comprises two retaining feet glued to the pane. Suitably, the retaining feet have include preferably cylindrical retaining protrusions, spaced apart from the pane.

In an advantageous feature, the fastening means comprises preferably two slides with slits disposed in an inclined plane; the slides can be mounted displaceably in the outer housing part, and cylindrical retaining protrusions of the retaining feet can be thrust into them.

In an advantageous further feature of the sensor according to the invention, two silicone pads are insertable into the inner housing part, which bring about the coupling between the transmitter and receiver and the pane.

In an advantageous feature of the invention, various essential elements of the sensor are insertable into the inner housing part. These are in particular prism parts for guiding the light beams, the transmitter and receiver, a heater for the measurement path, and an electronic circuit board. Advantageously, some elements are already premounted on this board.

A particular improvement in the sensor according to the invention comprises the provision of a second electronic circuit board parallel to the first that is joined to it via a flexible connection. This second circuit board preferably also carries the connection plug of the sensor. As a result of the flexible connection, a mechanical decoupling between the plug and the sensor is advantageously provided.

In another especially advantageous feature of the sensor according to the invention, pockets with detent springs are provided on the outer housing part, and one spring is inserted into each pocket, locking in detent fashion, in order to bring to bear the spring force between the inner and the outer housing part. An encompassing seal is also mounted on the outer housing part; it rests on the pane and seals off the interior of the sensor from its external surroundings.

BRIEF DESCRIPTION OF THE DRAWINGS

The invention is described in further detail in the ensuing description, in terms of an exemplary embodiment shown in the drawing wherein.

DETAILED DESCRIPTION OF THE EXEMPLARY EMBODIMENT

Figure 1:
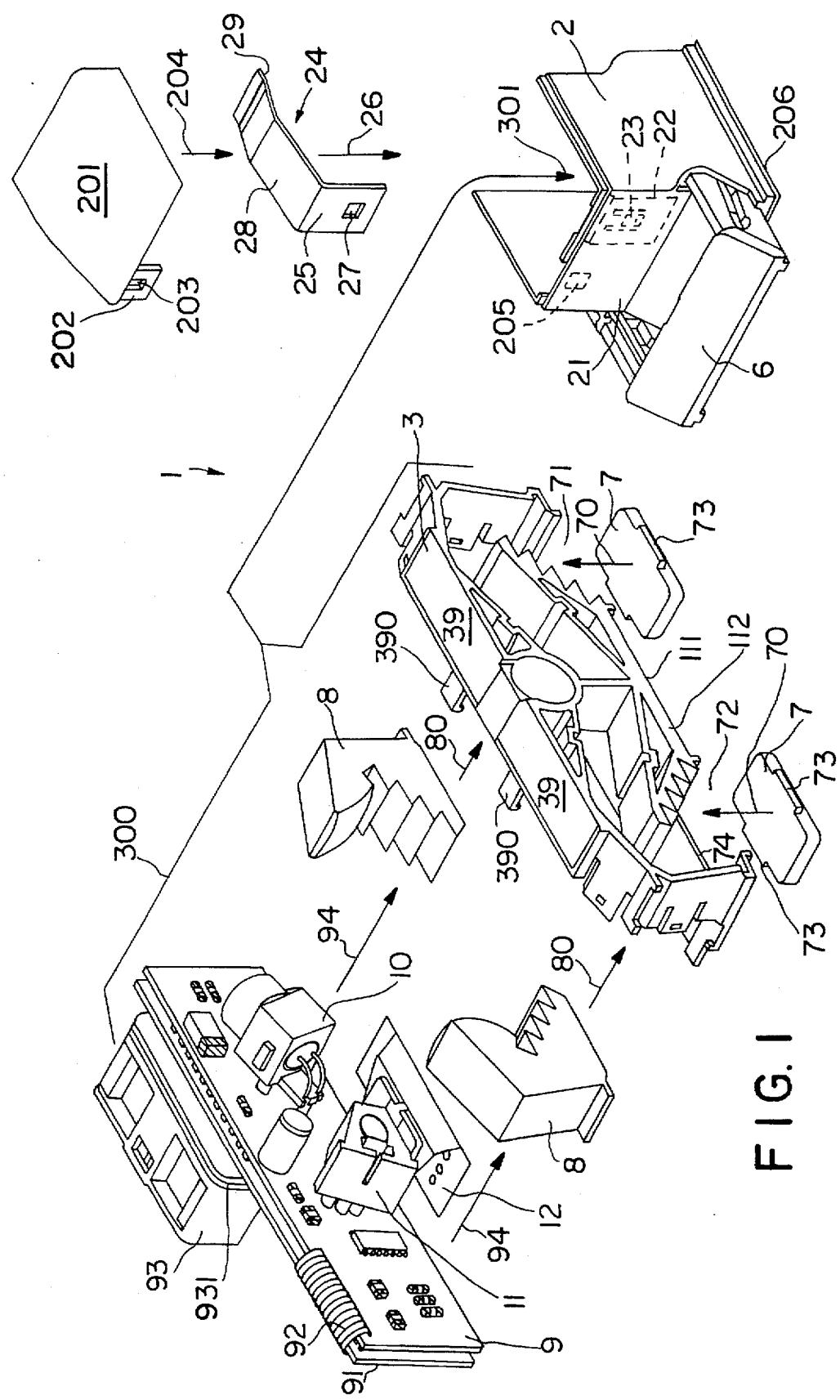
FIG. 1 is a perspective view of the sensor of the invention, the elements insertable into the inner housing part being shown in an exploded view.

In FIG. 1, the sensor 1 of the invention is shown in a perspective, exploded view. The sensor 1 has an outer housing part 2 and an inner housing part 3 as well as a fastening device 4, (FIG. 2) which comprises retaining feet 41 with cylindrical retaining protrusions 42 spaced apart from the pane 5. The fastening device 4 comprising the retaining feet 41 is glued to the pane 5. This can suitably be done separately from the mounting of the sensor 1 itself.

Figure 2:
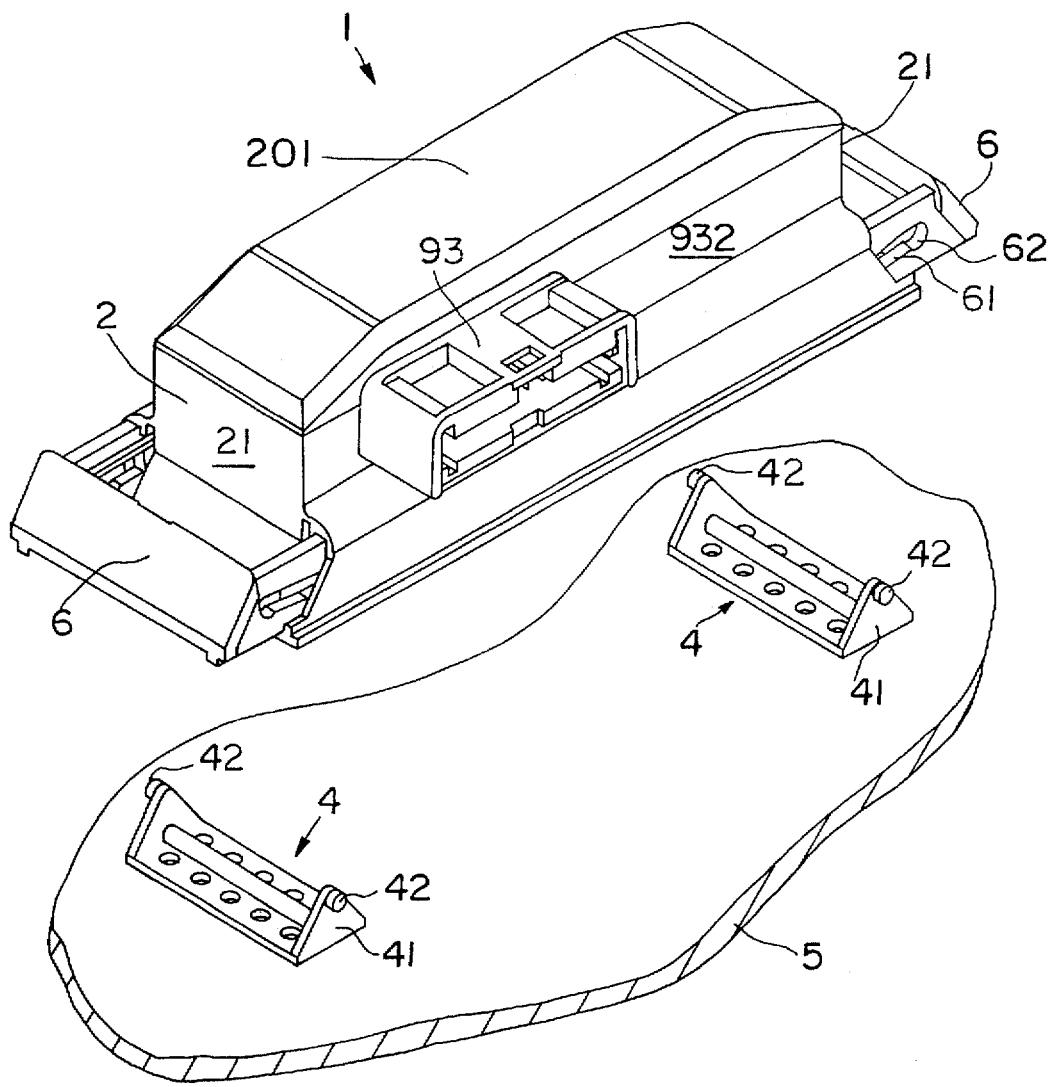
FIG. 2 is a perspective view of the sensor with the retaining feet that can be glued into the disk acting as a fastening device and with the slides, shown in the exploded state, as the fastening means.

A fastening means comprising two slides 6 is provided, displaceable in guides, in the outer housing part 2, as shown in FIG. 2. In the slides 6, slits 61 disposed in a plane that is inclined relative to the plane of the pane 5 are provided on either side of the slide 6 or outer housing part 2. For fastening the sensor 1, the sensor is placed on the retaining feet 41, and the slides 6 are thrust into the interior of the outer housing part 2. The slits 61 grasp the retaining protrusions 42, until the retaining protrusions, sliding on the inclined slits 61, lockingly engage round detent indentations 62. As a result, by means of the inclined plane of the slits 61, the sensor 1 is drawn, firmly seated, against the pane 5 and is releasably held by the detent locking.

As shown in FIG. 1, the inner housing part 3 comprises a kind of frame into which various parts are insertable. For greater simplicity, the front wall of the inner housing part 3 has been omitted, so that the variously embodied receiving chambers located behind it will be visible. Two slits are provided in the front wall that serve to receive front protrusions 73 of two silicone pads 7. The rear protrusions 73 of the silicon pads 7 rest on a lip identified by reference numeral 74. In the view of FIG. 1, this lip 74 is visible only in the region of the reception chamber 72. In the region of the transmission chamber 71, the corresponding lip is hidden by other parts in this view. The silicone pads 7 form windows that are as clear as glass facing the pane 5. They are inserted into the inner housing part 3 in the direction of the two upward-pointing arrows 70 and are retained there by the protrusions 73.

As the inner housing part 3 continues to be equipped, two prism parts 8 are now thrust from left to right in the direction of the two arrows 80 into the receiving chambers above the two silicone pads 7. These prism parts 8 deflect the beams of light in the sensor and expediently also contain lenses.

In accordance with the advantageous exemplary embodiment of the invention, both a transmitter 10 and a receiver 11 as well as a heater 12, along with other parts not relevant here, are mounted on an electronic circuit board 9. Parallel to the electronic circuit board 9, a second electronic circuit board 91 is also provided, which is joined to the first electronic circuit board 9 by means of a flexible connection 92. This second electronic circuit board 91 also carries a connection plug 93. By means of the flexible connection 92, the components in the inner housing part 3 are mechanically decoupled, so that movements at the connection plug 93 cannot affect the components inside. The component assembly comprising the electronic circuit boards 9 and 91 with their optoelectronic elements is thrust from the left as indicated by the arrows 94 into the corresponding receiving chambers of the inner housing part. Only the inner electronic circuit board 9 is then firmly held, for instance by detent hooks 390. The second electronic circuit board 9, as already noted, is held on the first electronic circuit board 9 only via the flexible connection 92. Once this has been done, the inner housing part 3 is now fully equipped with its elements and components.

The heater 12, as shown in FIG. 1, is embodied in a flat fashion, on the order of a heating plate. This heating plate is also designed and supported resiliently. Once the heater has been thrust into the associated receiving chamber 111 of the inner housing part 3, it is then pressed resiliently against the pane 5, between a flat bearing part 112 of the inner housing part 3 and the pane 5. The region covered by the heater 12 corresponds to the measurement path of the sensor 1 and is located between the two silicone pads 9. The heater provides de-icing of the measurement path and evaporation of any condensed water that may form in the interior of the sensor 1.

Once the inner housing part 3 has been equipped as indicated above, this joining together being represented in FIG. 1 by the large bracket 300, the inner housing part 3 is inserted from above into the outer housing part 2 in the direction indicated by the arrow 301.

A pocket 22 with a detent spring 23, as shown in dashed lines in FIG. 1, is provided on the inside of each end wall 21 of the outer housing part 2. A spring 24, approximately L-shaped, is inserted by one leg 25 into this pocket 22 in the direction of the arrow 26. There is a recess 27 in this leg 25. If the spring 24 is now thrust into the pocket 22 in the direction of the arrow 26, the leg 25 deflects the detent spring 23 in the pocket 22 until the detent spring 23 then fully engages the recess 27 and arrests the spring 24. The free leg 28 of the spring 24, on its front end, has a pressure or bearing face 29 protruding somewhat in the direction toward the inner housing part 3. With this pressure face 29, the spring 24 rests on an engagement face 39 on the upper end of the inner housing part 3. By means of these springs 24, which engage the outer housing part 2 in a firmly seated fashion, the inner housing part 3 and with it the parts contained in it are pressed in the direction of the pane 5. The dimensions of the components involved are selected such that the silicone pad 7 and the heater 12 always rest resiliently, under pressure, on the pane 5 once the sensor has been installed, or in other words when the fastening means 6 is in engagement with the fastening device 4 glued to the pane 5.

Once the inner housing part 3 has been inserted into the outer housing part 2 and the springs 24 have been inserted into the pocket 22, a closure cap 201 is finally place on the outer housing part 2, as shown in FIG. 1. On the closure cap, a fastening part 202 with a detent opening 203 is provided for fastening purposes. On insertion in the direction of the arrow 204, the fastening part 202 engages the interior of the outer housing part 2 and with its detent opening 203 comes into engagement with a detent protrusion 205, which is mounted on the side wall 21 in the interior of the outer housing part 2 and is shown in dashed lines in FIG. 1.

The foot of the outer housing part 3 is provided with an encompassing groove, not shown in the drawing. Secured in this groove is an encompassing seal 206, as shown in FIG. 1, which serves to seal off the interior of the sensor 1 from the outside and thus to keep dirt and water away from the interior. The seal 206 moreover serves the purpose of adapting to the curvature of the pane. Thus the thickness of the seal 206 in the mounted sensor 1 may be 2 mm in the middle and 1.7 mm on each of the edges. This assures that the sensor 1 will rest on the pane 5 in a way independent of tolerances. The force for this is transmitted to the seal 206 by the slides 6 and the retaining feet 41.

In an especially advantageous way, according to the invention, the coupling of the transmitter 10 and receiver 11 via the respective silicone pads 7 is entirely independent of how the sensor 1 rests fasteningly on the pane 5, since they are pressed against the pane 5 with the spring force that prevails between the inner housing part 3 and the outer housing part 2 and that is brought to bear by the springs 25. This coupling pressing of the silicone pads 7 against the pane is likewise accordingly tolerance-independent.

The connection plug 93 is provided with an encompassing groove 931, as shown in FIG. 1, on its side toward the outer housing part 2. The outer wall 932 of the outer housing part 2 located on the side of the connection plug 93 and the adjacent part of the closure cap 201 are provided with a recess not shown in the drawing, which is larger in its dimensions than the groove 931 of the connection plug 93. This assures that the connection plug 93 can move even in the complete sensor 1 without the sensor 1 itself being moved. The flexibility of the electronic circuit board 91, acting as a support for the connection plug 93, is thus also transmitted to the outside and assured.

The invention includes both a simple fastening of the sensor 1 and a highly advantageous structure thereof. The fastening feet 41 may be glued precisely in position against the windshield 5 by the windshield manufacturer. At the automobile builder, the complete sensor 1 is then secured to it by means of the slides 6. This special structure affords a major advantage, which is that it is unnecessary to glue optical components to the pane. By splitting the housing into an outer housing part 2 and an inner housing part 3, the force for coupling the silicone pads 7 acting as windows is dictated only by the spring force of the springs 24, which acts between the outer and inner housing part. The optical coupling to the windshield and the contact of the sensor 1 and its seal 206 with the windshield are thus accomplished independently of one another in terms of tolerances.

We claim:

1. A sensor for optically detecting foreign bodies on a pane, said sensor including a transmitter and a receiver, which are coupled on the inside of the pane and detect foreign bodies on the outside of the pane in the region of a measurement path between the transmitter and the receiver; and, wherein: the sensor includes an outer housing part and an inner housing part as well as a fastening device that is glued to the pane; the functional elements of the sensor are held by the inner housing part, and a fastening means is mounted on the outer housing part and engages the fastening device in order to releasably secure the sensor to the pane; the inner housing part is pressed against the pane by the force of at least one spring which engages the outer housing part; pockets with a detent spring are provided on the outer housing part; and a respective said spring is inserted into each of these pockets so that it locks in detent fashion, and these springs, rest with pressure faces on one face of the inner housing part, and press the inner housing part forward toward the pane.

2. The sensor of claim 1, wherein the fastening device comprises two retaining feet glued to the pane.

3. The sensor of claim 2, wherein the retaining feet have cylindrical retaining protrusions spaced apart from the pane.

4. The sensor of claim 1, wherein the fastening means comprises two slides with restraint means, including slits which are located in an inclined plane, which are mounted in the outer housing part and guided displaceably, and and which, engage in lockingly parts of the fastening device.

5. The sensor of claim 1, wherein two silicone pads are inserted into the inner housing part between the transmitter and receiver and effect the coupling of the transmitter and the receiver to the pane, and by means of which pads, the spring force acting against the inner housing part presses the inner housing part against the pane.

6. The sensor of claim 1, wherein two prism parts are mounted in the inner housing part and each undertakes the guidance of a beam of light between the transmitter and the receiver.

7. The sensor of claim 1, wherein the transmitter and receiver are inserted into the inner housing part.

8. The sensor of claim 1, wherein a heater is inserted into the inner housing part and positioned so that it heats the pane in the region of the measurement path between the transmitter injection region and the receiver decoupling region.

9. The sensor of claim 8, wherein the transmitter, receiver and heater are secured to an electronic circuit board and are inserted together into the inner housing part.

10. The sensor of claim 1, wherein at least one electronic circuit board is secured to the inner housing part.

11. The sensor of claim 10, wherein a second electronic circuit board is mounted parallel to the electronic circuit board by a flexible connection, on which a connection plug for the sensor is also disposed.

12. The sensor of claim 1, wherein an encompassing seal is provided on the outer housing part, with the seal resting on the pane and sealing off the interior of the sensor from the outside.

13. The sensor of claim 1 wherein the pane is the windshield of a motor vehicle and the foreign objects are raindrops.

* * * * *